United States Patent Office 3,435,575
Patented Apr. 1, 1969

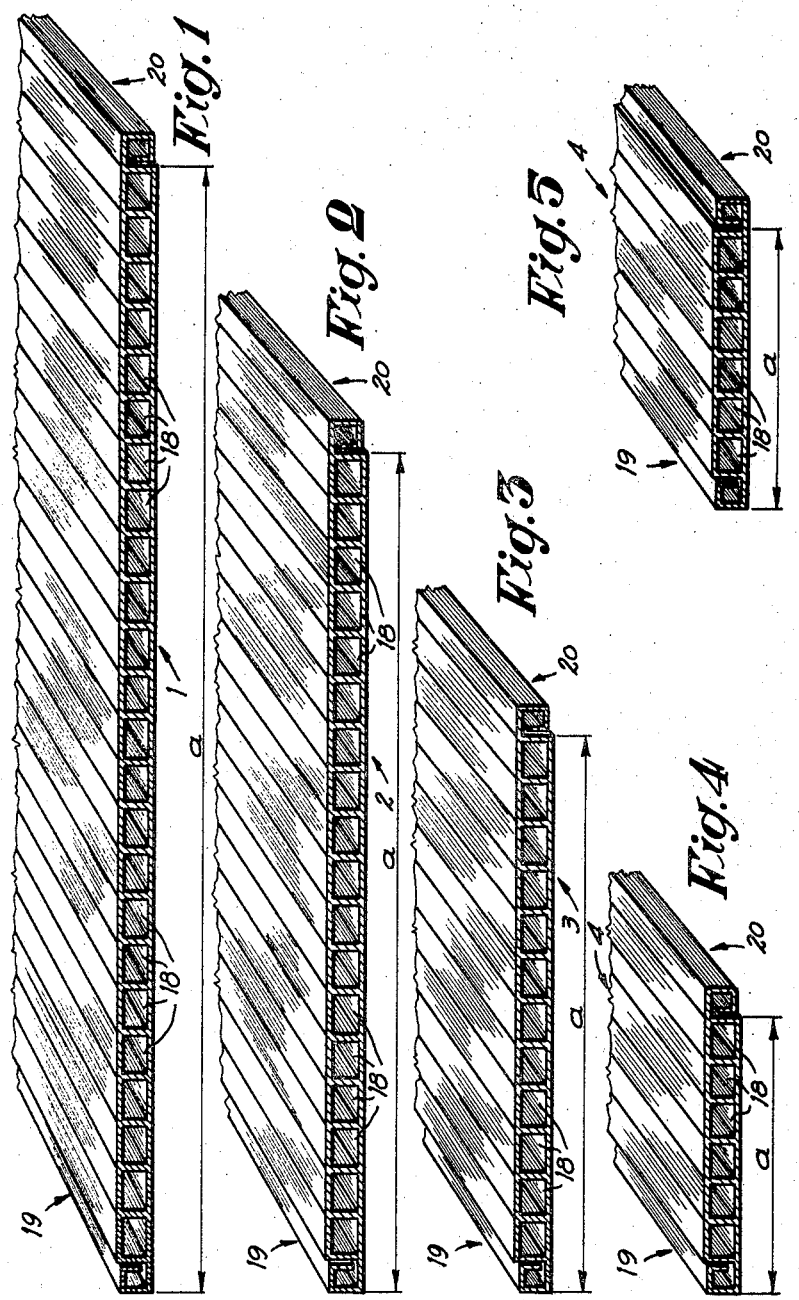

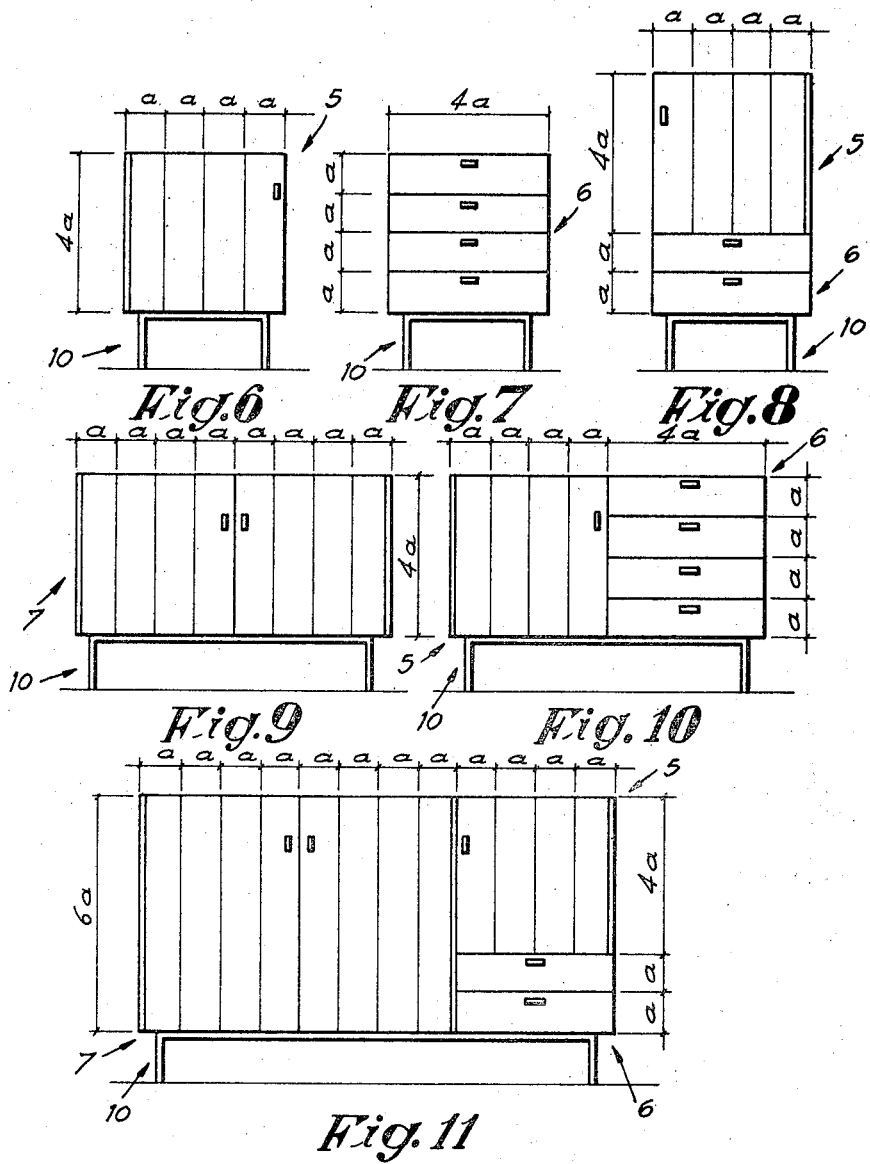

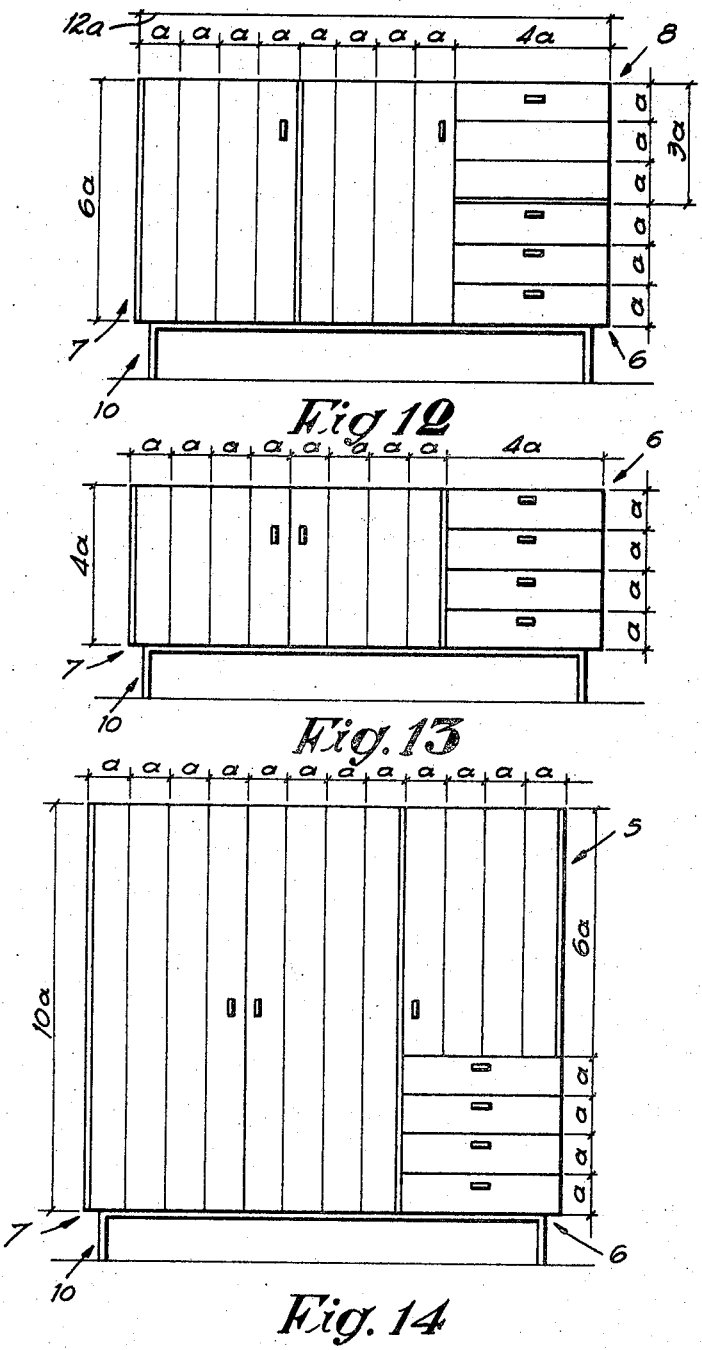

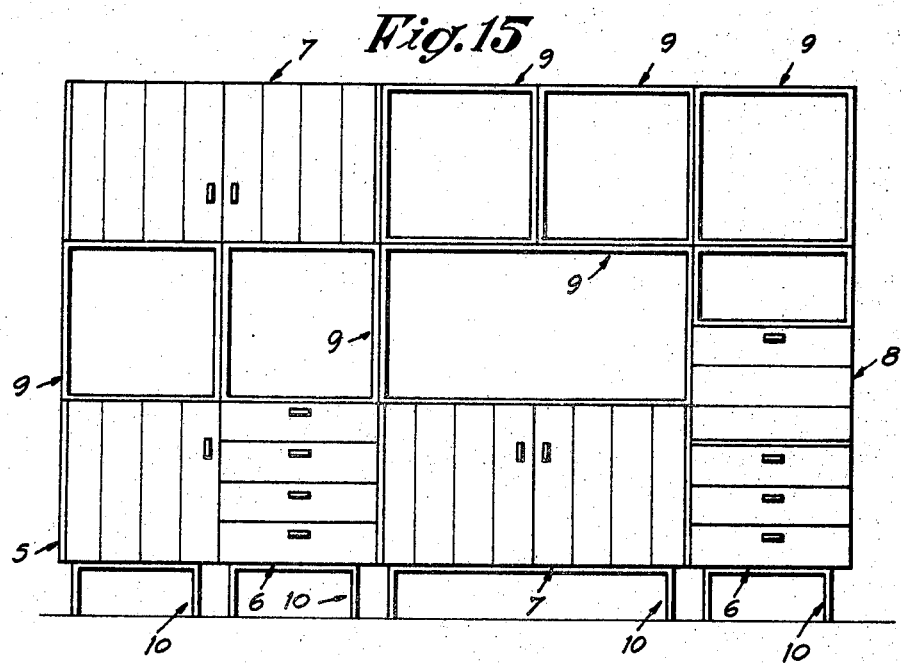
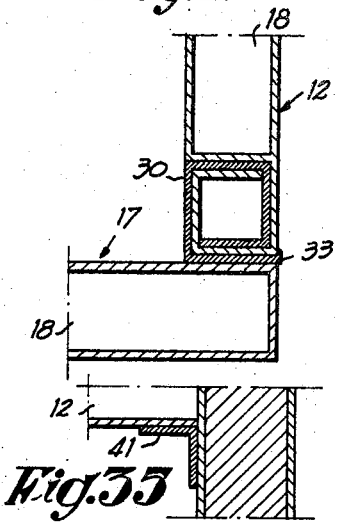
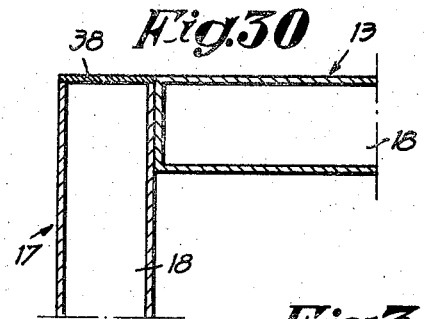
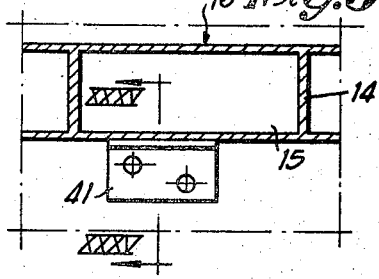

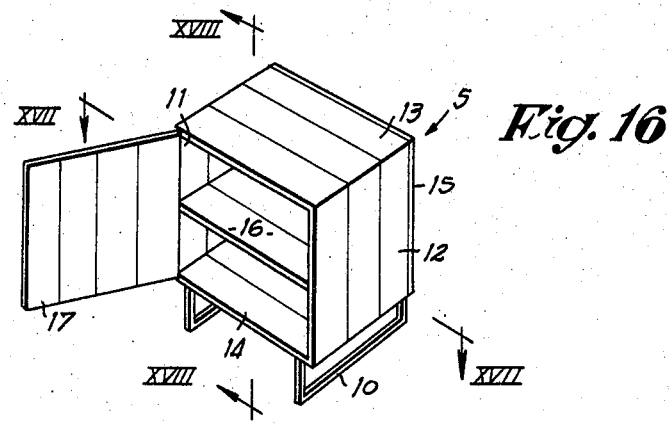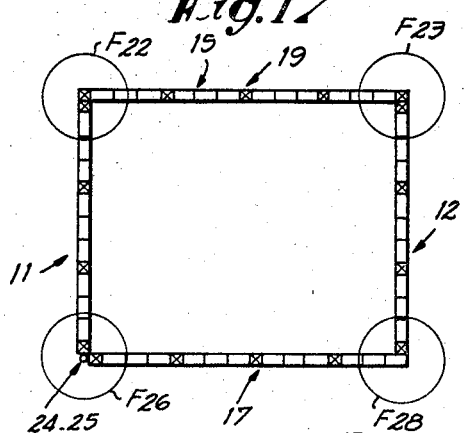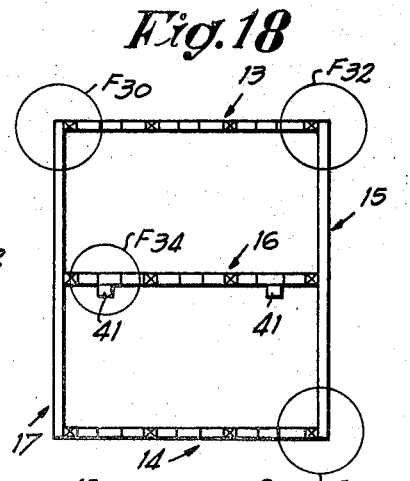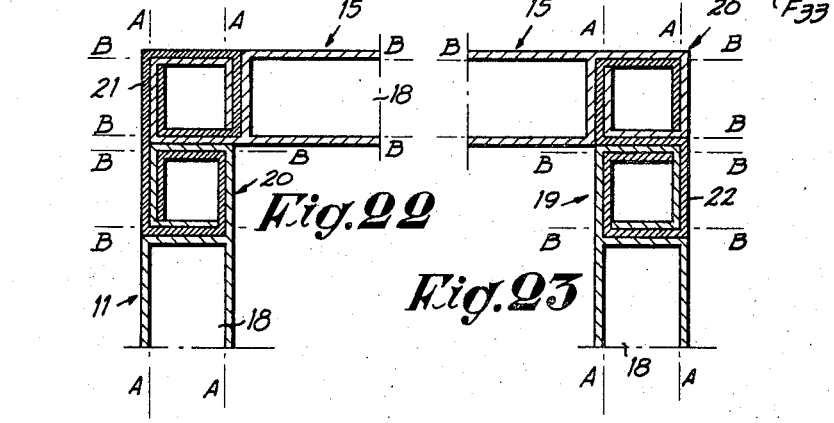

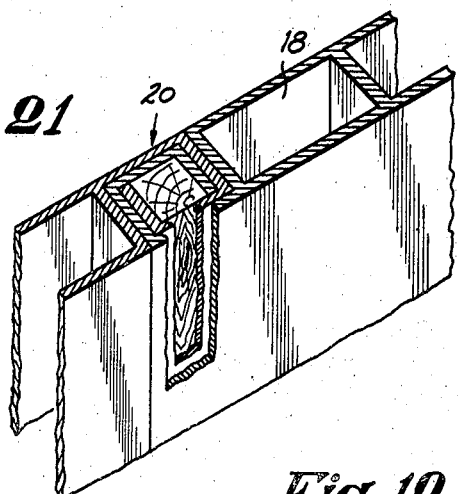
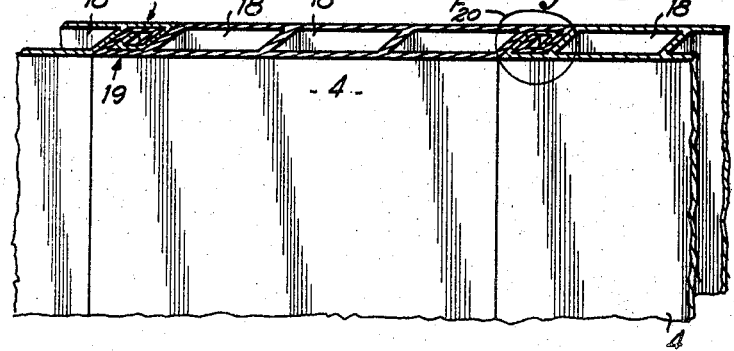
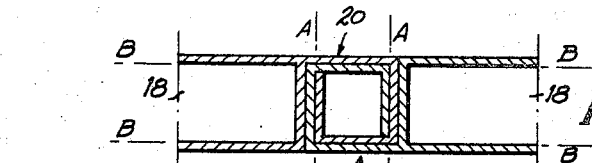
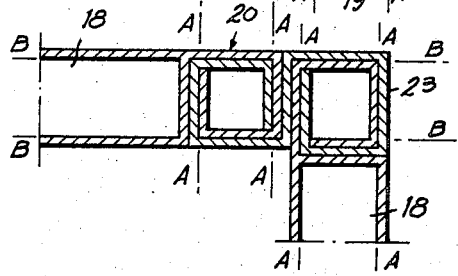

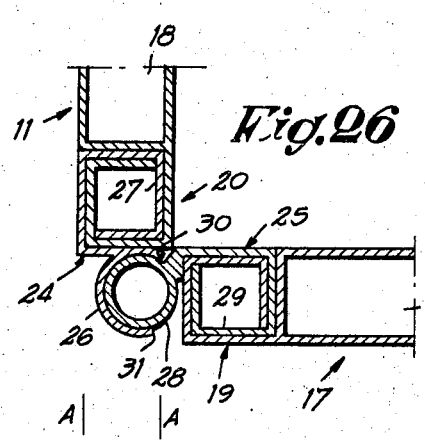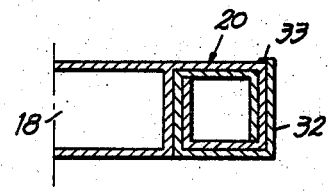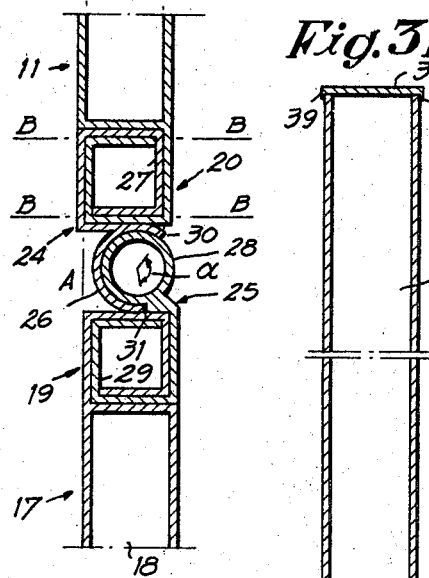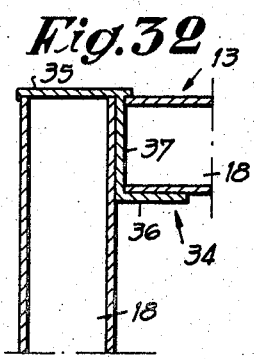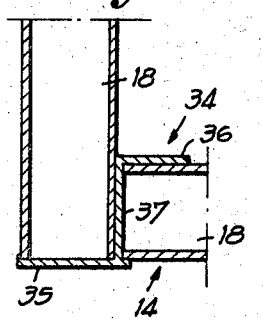

3,435,575
PROCESS AND EXTRUDED ELEMENTS FOR INDUSTRIAL MANUFACTURING OF FURNITURE, FURNITURE COMPONENTS AND SIMILAR CONSTRUCTIONS
Frantz Louis Charles Pottiez, Brussels, Belgium, assignor to "Meurop" Societe Anonyme, Rijmenam, Belgium
Filed Jan. 21, 1966, Ser. No. 522,281
Claims priority, application Belgium, Nov. 22, 1965, 45,122; Nov. 26, 1965, 45,141
Int. Cl. A47b 96/20, 47/04; F16b 12/02
U.S. Cl. 52—282
12 Claims

ABSTRACT OF THE DISCLOSURE

A construction, such as a piece of furniture or component part thereof, consists of at least two elements having parallel lateral walls and end walls and substantially square edge members interconnecting these elements. One of the walls of an edge member is located in an extension of one of the lateral walls. Another wall of the edge member is located at a distance from the other lateral wall equal to the thickness of the edge member walls. Yet another wall of the edge member is located at a distance from an adjacent end wall which is equal to said thickness and terminates at a distance from said one wall which is also equal to said thickness. Additional means, such as an adhesive, a hardening material or a tightening wedge-shaped element, are also used to fix the interconnected edge members.

---

The present invention relates to the furnishing industry and refers more particularly to the manufacturing technique of pieces of furniture, furniture components and similar constructions by highly productive methods based on a limited number of modulated elements which however can be combined in an infinity of ways, the production of said modulated elements, as well as their assembly being possible under extremely economical conditions, by semi-skilled labour, at a very fast rate.

The process and the elements which are characteristic features of the present invention are particularly original, not only because they introduce in the technology of furniture making extruded plastic materials, but also and mainly on account of the fact that said pieces of furniture or components thereof are provided with isothermal cellular walls. It is needless to expound the advantages of such isothermal walls, namely for kitchen furniture. Moreover, with an equal and even higher degree of resistance to that of pieces of furniture with solid walls, this new technology makes it possible to work with a minimum weight of material, which is important especially for large pieces of furniture and, more especially, for complex combinations of cabinets, shelves, etc.

Further, those same modulated extruded elements can have the additional advantage of being self-assembling i.e., that they comprise in their very design the essential elements needed for their mutual assembly in a large variety of forms, for the fixed elements as well as for the movable ones: side walls, rear walls, top and bottom walls, partitions, pivoting or slap-doors, as well as various drawers and partitions.

The process conforming to the present invention substantially consists, with the hely of modulated elements made of some extruded plastic material with shaped longitudinal edges, in assembling aforesaid elements by means of said shaped edges and in securing the fastening of said assemblies by the insertion of any appropriate material or element.

This invention, apart from the general process of its various forms of application, also includes all modulated elements and more particularly all hollow or sectionalized modulated elements obtained by extrusion of a plastic material and specially intended and designed for the industrial manufacture of furniture and similar constructions.

These elements according to the present invention can be prepared so as to make possible the use of the traditional systems or appliances for fastening and assembling, or they can also be shaped in such way as to incorporate their own system of assembly with an adjoining element placed in the same plane or in orthogonal planes.

All these characteristic features will be better understood from the following more detailed description of a certain number of typical elements and of their mutual assembly for making, on a large industrial scale, pieces of furniture or parts thereof, such description being given with reference to the various appended drawings which, however, are given by way of example only. In these drawings:

FIGURES 1 to 4 illustrate partial perspective views of four similar elements of a modulated series;

FIGURE 5 shows another embodiment of the unit element of FIGURE 4;

FIGURES 6 to 15 illustrate in a very diagrammatic way and merely by way of example, a series of pieces of furniture and combinations thereof produced by applying the process and the elements conforming to the present invention;

FIGURE 16 illustrates diagrammatically, by way of example, a perspective view of a furniture unit which is similar to that which is represented in FIGURE 6;

FIGURES 17 and 18 are cross-sections along lines XVII—XVII and XVIII—XVIII of FIGURE 16, respectively;

FIGURE 19 illustrates as a partial perspective view a fixed or movable partition of a piece of furniture, comprised in a single plane;

FIGURE 20 is a horizontal cross-section illustrating on an enlarged scale, the part indicated in the circle F20 of FGURE 19;

FIGURE 21 is a perspective illustration with partial cross-section of a variant of that part shown in F20 of FIGURE 19;

FIGURES 22 and 23 illustrate as horizontal cross-section and on an enlarged scale, the parts indicated in the circles F22 and F23 respectively of FIGURE 17;

FIGURE 24 illustrates an alternative of the assemblage elements of FIGURES 22 and 23;

FIGURE 26 illustrates on an enlarged scale, a cross-section of the part indicated by F26 in FIGURE 17;

FIGURE 27 is similar to FIGURE 26, except that the movable element is illustrated therein in a second characteristic position;

FIGURE 28 illustrates, as a horizontal cross-section and on an enlarged scale, the part indicated by F28 in FIGURE 17;

FIGURE 29 illustrates as a horizontal cross-section, a terminal element of a section or characteristic part of a piece of furniture conforming to the invention;

FIGURE 30 illustrates as a horizontal cross-section and on an enlarged scale the part indicated in the circle F30 of FIGURE 18;

FIGURE 31 illustrates an alternative of an end-on terminal element of a section or part of a piece of furniture characteristic of the present invention;

FIGURES 32 and 33 illustrate as vertical cross-sections and on an enlarged scale, the parts indicated in the circle F32–F33 respectively of FIGURE 18;

FIGURE 34, illustrates on an enlarged scale, the part indicated in the circle F34 of FIGURE 18;

FIGURE 35 is a cross-section along the line XXXV—XXXV of FIGURE 34;

Figure 25:
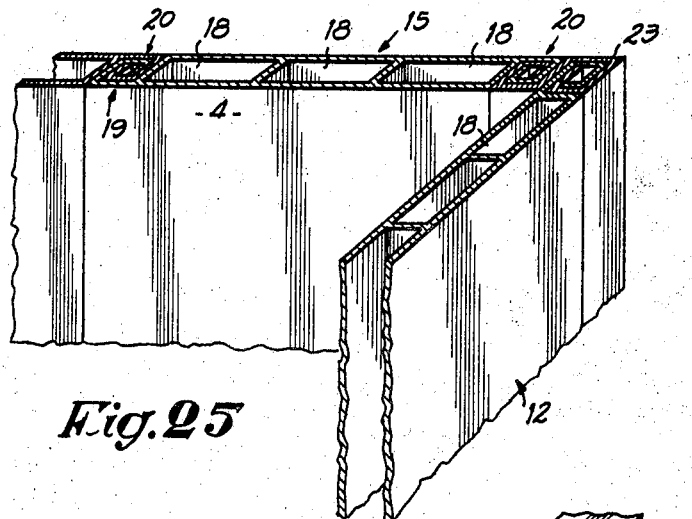
FIGURE 25 illustrates as a perspective view an application of FIGURE 24.

The pieces of furniture diagrammatically illustrated in FIGURES 5 to 15 are merely shown by way of example, since their actual construction in their various combinations is infinitely variable. The examples have however been chosen with the object to convey a better understanding of the particularly economic nature of the process and the elements of pieces of furniture described in the present invention, not only on account of the specific properties of the plastics used, which are generally vinyls, polystyrenes, or the like, but also and mainly on account of the new technology introduced into the furniture industry and leading to the manufacture of light, isothermal, modulated, resistant elements, one of the major advantages of which is that they lend themselves to mass production.

In FIGURES 1 to 4 are illustrated modulated elements, 1–2–3 and 4 of respective widths $4a$, $3a$, $2a$ and $a$.

FIGURE 5 illustrates only an alternative of the relative positions in the assembly of the elements.

For a normal fabrication of combinable pieces of furniture comprising all kinds of cupboards and shelves, there is a decided advantage in making use of such base-like elements the width $a$ which is of the order of magnitude of 150 mm. with elements of widths $a$, $2a$, $3a$, $4a$, etc., a thickness of the order of 18 to 20 mm. and the actual material being $8/10$ to 1 mm. thick.

On the other hand, in the series of examples illustrated diagrammatically in FIGURES 6 to 15, 5 represents pieces of furniture of parts thereof with a single door mounted on hinges with vertical axis, 6 pieces of furniture or parts thereof with a door, 7 pieces of furniture or parts thereof with a double door with vertical hinges, 8 pieces of furniture or parts thereof with a single door mounted on a horizontal hinge, 9 pieces of furniture or parts thereof without either door or partition.

These pieces of furniture or parts thereof can be used either as such or in combination with any appropriate foot-piece illustrated diagrammatically in 10.

Taking, by way of example, a piece of furniture or part thereof belonging to the type indicated in 5 and diagrammatically illustrated as a perspective view in FIGURE 16, it is clear that it merely consists of two side walls 11–12, a top 13, a bottom 14, a back wall 15, in this particular instance a horizontal dividing partition 16, a door 17. The foot-piece 10 is optional and not included in the present invention.

For making those various walls 11 to 16 as well as the door 17, the starting elements shall be extruded sections, such as the types illustrated in FIGURES 1 to 5, it being understood that said sections are essentially variable.

These sections preferably consist of a box-shaped element or caisson provided with cross-pieces so as to form compartments or pigeon-holes 18 and two longitudinal hookshaped edges 19–20 shaped in order to provide a double overlapping joint in right-angled planes between two adjacent sections. An assembly of this kind is illustrated for instance in FIGURES 19 to 21.

It should be mentioned that these assemblies between adjacent sections are carried out by multiple overlapping in two right-angled planes, indicated in the present instance by A—A and B—B.

Such an assembly can be made between any number of such sections or elements as well as between groups of such assemblies in order to produce walls the thickness of which is substantially a multiple of the width of a single unit section of width $a$. A wall could thus be made out of a single element of width $a$, $2a$, $3a$, $4a$, etc., according to circumstances.

For assembling two elements at right angles, use shall be made of a special section of extremely small bulk, which the function of which is to engage simultaneously the jointing edges 19 and/or 20 of both adjacent walls while holding them strongly together. Examples of such intermediate elements are illustrated in FIGURES 22, 23 and 24. FIGURE 22 illustrates the assembly indicated in the circle F22 of FIGURE 17. The intermediate element 21 has a U-section of which both side-branches are folded three times at right-angles toward the inside so as to secure the double-overlapping in right-angled planes with the adjacent edges of the corresponding walls, in the present instance of side wall 11 and rear wall 15.

An equivalent arrangement is illustrated in FIGURE 23 which refers to the assembly indicated in the circle F23 of FIGURE 17. In this form of embodiment, however, the intermediate element 22 is approximately of S-shape also designed for securing multiple overlaps around said orthogonal planes A—A and B—B.

By applying these intermediate elements 21–22, the result is obtained that the side walls 11–12 are, so to say, situated toward the inside with respect to the rear wall 15.

It is however quite as easy to make an assembly whereby said side walls are situated toward the outside with respect to aforesaid rear wall 15. Such an embodiment is illustrated in FIGURES 24 and 25. The intermediate assembling element 23 is very similar to element 22, with this difference though, that the width of the various constituent parts of said element is adapted to the dimensions of the corresponding parts of adjacent walls with which they must come into contact.

On the other hand, for making a hinged assembly, as indicated in F26 of FIGURE 27, use can also be made of special extruded sections, as illustrated in horizontal cross-section in FIGURES 26 and 27. In this particular instance, this intermediate element is, in fact, formed by the cooperation of two extruded elements, viz.: a female one 24 and a male one 25. The female element comprises an open tubular part 26 connected to a box-section 27 conditioned, for instance, as indicated for the previous assemblies in order to also secure the double overlap according to the right-angled planes A—A and B—B.

The tubular part 26 is provided with a wide opening which, in the example shown, extends over an angle $\alpha$ of the order of 120°. The male part 25 is provided with a closed tubular part 28 which is also part of a box-like fitting 29, such as described for the female part. The outer diameter of said tubular closed part 28 is practically equal to the internal diameter of the open tubular part 26. Some kind of stop can be used in order to prevent any unwanted axial displacement of these two tubular parts 26–28 respectively which are mutually and concentrically engaged. The edges 30–31 limiting the angular motion can easily be used as end-stops of the door 17 in its two characteristic positions, i.e., closed and open. This latter, in its closed position, will come into contact with the outer edge of the corresponding vertical wall 12 and any known means can also be applied for holding the door in the closed position. Generally, use will be made of magnetic closing devices. This does not prevent however a proper finishing to all visible edges, both of the walls and of the door, in order to give to the pieces of furniture or parts thereof, a neat and finely finished aspect. For this purpose, use can be made of a terminal extruded section such as, for instance, that which is illustrated in FIGURE 29. Such an extruded section will consist for instance of the sole box-like parts of the previously described sections 24–25. Such terminal elements could also be fitted with a little overlapping edge 33 which would add to the good looks of the corresponding walls and doors.

The application of such a terminal extruded section to the part illustrated in the circle F28 of FIGURE 17 is shown in FIGURE 28.

For connecting the top 13 and the bottom 14 on the one hand, with the side walls 11–12 and the rear wall 15 on the other hand, use can also be made of special extruded sections of approximate Z-shape with right-angled branches as illustrated by way of example in FIGURES 32 and 33.

Such sections as illustrated in 34 have a branch 35 capable of forming a closing band for the ends of the walls, while another branch 36 may be used as seat or stopping element for the top part 13 and the bottom 14 respectively, the intermediate branch 37 of said section having a height which is substantially equal to the thickness of aforesaid horizontal walls 13–14.

The embodiments illustrated in FIGURES 32 and 33 refer to the parts indicated respectively in the circles F32 and F33 of FIGURE 18.

For the end-on parts of the fixed or movable walls which do not hide the inner structure of the construction, it is possible, as illustrated diagrammatically in FIGURE 13, to make use of simple closing bands 38 stuck onto the corresponding parts of the walls. FIGURE 30 illustrates the part indicated in the circle F30 of FIGURE 18, i.e., the contact between the door 17 and the visible edges of the furniture walls, in the present case the headpart 13.

In certain cases, said closing bands 38 could also be provided with small edge-ribs 39–40 as illustrated in cross-section in FIGURE 31. An arrangement of this kind will have advantages in all cases where such ribs are no obstacle to the normal assembly of the piece of furniutre. In fact, they contribute to the neat finishing of the walls.

Figure 36:
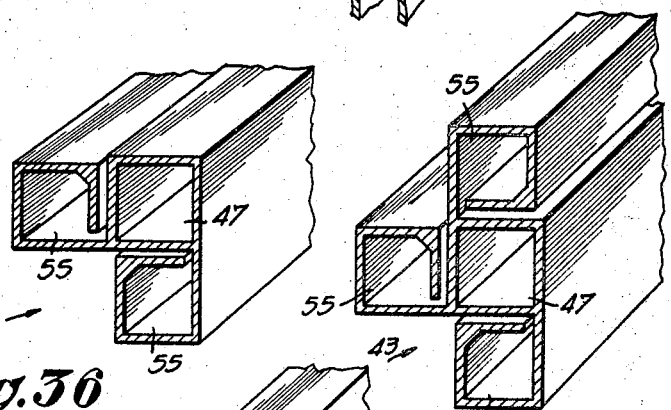
FIGURES 36, 37 and 38 illustrate in a partial perspective view intermediate extruded sections for assembling in orthogonal planes two, three and four elements or components of pieces of furniture, respectively.
Figure 37:
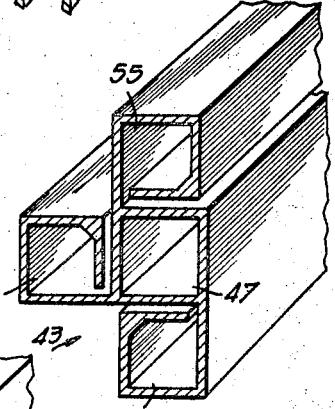
Figure 38:
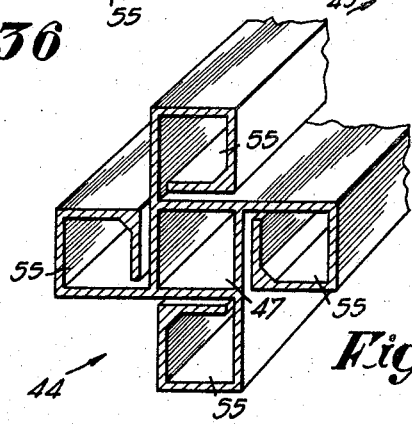
Figure 39:
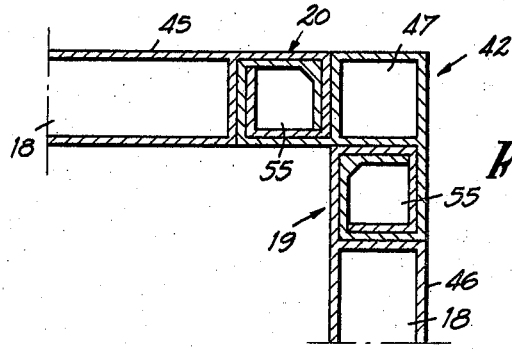
FIGURES 39, 40 and 41 illustrate as a cross-section, the application of sections according to FIGURES 36, 37, 38, respectively.
Figure 40:
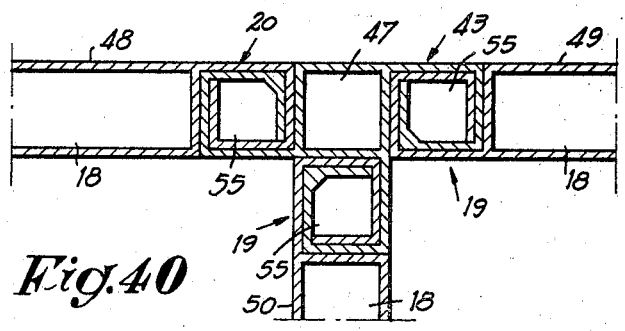
Figure 41:
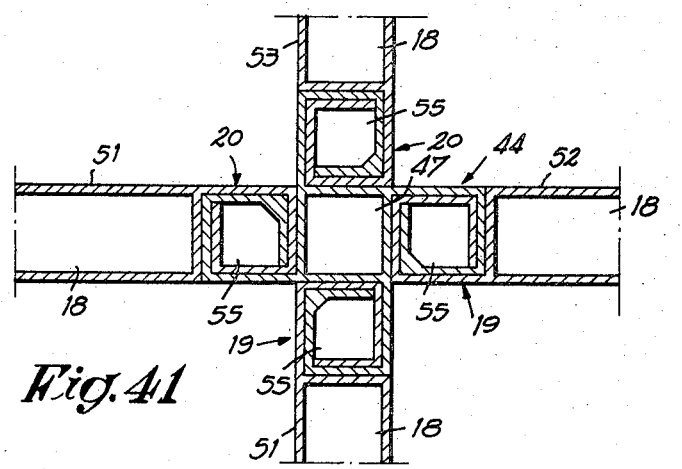

For fastening the partition walls, such as the horizontal wall 16, use can be made of any of the traditional means such, for instance, as illustrated in FIGURES 34 and 35, those consisting in simply fastening any known means to the proper places of the inside side walls 11–12, small corner strips 41 serving as support to the separation wall 16. Any other appropriate means can of course be used for securing the assembly and the fastening between orthogonal partitions; use can also be made of intermediate extruded elements in sufficient numbers and of appropriate shapes to fit the walls to be assembled. These elements can, in fact, be respectively arranged in T-shape or in cross-shape according as to whether an assembly be required between two, three, or four adjacent walls. By way of example, such extruded elements are illustrated in a partial perspective view in FIGURES 36, 37 and 38 in which the element 42 is intended for a corner assembly, the element 43 for a T-assembly and the element 44 for a cross-assembly. Such assemblies are illustrated respectively in FIGURES 39, 40 and 41. In FIGURE 39, two walls 45–46 are assembled by an element 42 the characteristic of which is to provide a cell 47 which could be used for applying a strengthening means. FIGURE 40 illustrates the assembly of three walls 48–49–50 by a T-shaped element 43 provided with the same strengthening cell 47. Finally, FIGURE 41 illustrates the assembly of four walls 51–52–53–54 by means of a cross-shaped element 44 which also provides a central cell for strengthening if needed. In this respect, it should be noted that, in all assembly elements which have been shown, provision has been made for delimiting cells 55 capable of housing any kind of products or elements for any desired purpose.

It is also possible to introduce therein similar elements or materials capable of promoting the strengthening or the mutual fastening of adjacent parts in order to reinforce thereby the actual assemblies themselves. Simultaneously, use can be made of these same materials or elements for considerably increasing the resistance and the strength of the whole of the manufactured products, in the manner which has become of current application in armoured constructions.

As mentioned previously, the various elements have only been indicated by mere way of example, so that free use can be made of any section capable of being extruded and applied to the conditions disclosed by the process of the present application. Use can also be made of all kinds of plastics and the elements can be applied in combination with any other accessories and more especially with the additional elements belonging to the traditional furnishing industry.

The present invention concerns the actual process as well as the pieces of furniture, components thereof, and the extruded sections more particularly such which are specially intended for use in the furniture industry and similar constructions.

I claim:

1. A construction, such as a piece of furniture, comprising at least two elements each having two parallel lateral walls, two end walls and at least a hook-shaped edge adjacent one of said end walls, said elements having interconnecting adjacent edges which are of similar structure, each of said edges having four mutually perpendicular walls of a predetermined thickness and forming a square, the first of said four walls being situated in the prolongation of one of said lateral walls, the third of said four walls being situated at a predetermined distance from a prolongation of the other of said lateral walls equal to said thickness, and the fourth of said walls being located at a distance from the adjacent end wall substantially equal to said thickness and terminating at a distance of said first wall substantially equal to said thickness, and at least one additional means fixing said interconnected edges.

2. Construction according to claim 1, wherein at least one of said elements has two edges the first walls of which are located in the same plane as one of said lateral walls.

3. Construction according to claim 1, wherein at least one of said elements has two edges the first walls of which are located in the planes of said lateral walls respectively.

4. Construction according to claim 1, wherein two of said elements are located in the same plane, their adjacent edges being engaged in each other.

5. Construction according to claim 1, wherein said elements are located in different planes, and wherein said means comprise at least one intermediate element engaged in the adjacent edges of said elements.

6. Construction according to claim 5, wherein two elements are located in perpendicular planes and that said intermediate element has two edges which are of a similar structure as the adjacent two elements and which are engaged in said latter edges.

7. Construction according to claim 5, wherein three elements are located in two perpendicular planes and said intermediate element has three edges which are of a similar structure as the adjacent edges of said three elements and which are engaged in said edges.

8. Construction according to claim 5, wherein four elements are located in two perpendicular planes and said intermediate element has four edges which are of a similar structure as the adjacent edges of said four elements and which are engaged in said edges.

9. Construction according to claim 5, wherein two intermediate elements are engaged in the edges of respective elements, said intermediate elements having concentric tubular parts which are mutually engaged.

10. Building construction according to claim 1, wherein at least one element is made as a section of extruded plastic material, in the shape of a flat crossbraced caisson.

11. Building construction according to claim 5, wherein said intermediate element is made as a section of extruded material.

12. Building construction according to claim 1, wherein said additional means consists of an adhesive, a hardening material or a tightening wedge-shaped element.

References Cited

UNITED STATES PATENTS

| | | | |
|---|---|---|---|
| 2,272,910 | 2/1942 | Gobberdiel | 52—282 X |
| 2,648,409 | 8/1953 | Daugherty et al. | 52—282 X |
| 2,882,564 | 4/1959 | Couse et al. | 52—282 X |
| 3,288,319 | 11/1966 | Cahill | 312—108 X |
| 3,331,174 | 7/1967 | Wesch et al. | 52—615 X |

FOREIGN PATENTS

| | | |
|---|---|---|
| 1,311,988 | 11/1962 | France. |
| 802,635 | 10/1958 | Great Britain. |

ALFRED C. PERHAM, *Primary Examiner.*

U.S. Cl. X.R.

52—234, 594, 204; 312—108, 111